(12) United States Patent
Sedayao et al.

(10) Patent No.: US 10,176,018 B2
(45) Date of Patent: Jan. 8, 2019

(54) VIRTUAL CORE ABSTRACTION FOR CLOUD COMPUTING

(75) Inventors: Jeffrey C. Sedayao, San Jose, CA (US); Cindy A. Smith, Cameron Park, CA (US); Hong Li, El Dorado Hills, CA (US); Terry H. Yoshii, West Sacramento, CA (US); Christian D. Black, Sacramento, CA (US); Vishwa Hassan, Chandler, AZ (US); David W. Stone, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 1604 days.

(21) Appl. No.: 12/974,919

(22) Filed: Dec. 21, 2010

(65) Prior Publication Data

US 2012/0158967 A1   Jun. 21, 2012

(51) Int. Cl.
*G06F 15/173* (2006.01)
*G06F 9/50* (2006.01)

(52) U.S. Cl.
CPC .......... *G06F 9/5072* (2013.01); *G06F 9/5077* (2013.01); *G06F 2209/509* (2013.01)

(58) Field of Classification Search
CPC ... G06F 1/00; G06F 9/455; G06F 1/26; G06F 1/3234; G06F 1/3203; G06F 1/3275
USPC ......... 709/226, 223, 224; 713/300, 320, 324
See application file for complete search history.

(56) References Cited

U.S. PATENT DOCUMENTS

| | | | |
|---|---|---|---|
| 7,389,403 B1* | 6/2008 | Alpert | G06F 9/3851 712/10 |
| 8,225,315 B1* | 7/2012 | Cheng | G06F 9/455 718/1 |
| 8,543,843 B1* | 9/2013 | Cheng | G06F 9/3851 713/300 |
| 2006/0064697 A1* | 3/2006 | Kagi | G06F 9/5011 718/103 |
| 2006/0123223 A1* | 6/2006 | Mayfield | G06F 9/4403 713/2 |
| 2011/0161609 A1* | 6/2011 | Oyamada | G06F 11/2069 711/162 |
| 2011/0202657 A1* | 8/2011 | Chang | G06F 9/505 709/226 |
| 2011/0296022 A1* | 12/2011 | Ferris | G06F 9/5072 709/226 |
| 2011/0302425 A1* | 12/2011 | Saripalli | H04L 41/044 713/189 |
| 2012/0029901 A1* | 2/2012 | Nielsen | G06F 9/542 703/22 |
| 2012/0096271 A1* | 4/2012 | Ramarathinam | H04L 63/0807 713/172 |
| 2012/0179874 A1* | 7/2012 | Chang | G06F 9/45558 711/128 |
| 2012/0185913 A1* | 7/2012 | Martinez | G06F 9/455 726/1 |

* cited by examiner

*Primary Examiner* — Dhairya A Patel
(74) *Attorney, Agent, or Firm* — Jordan IP Law, LLC

(57) ABSTRACT

A system and method provide for mapping a virtual core of a computing system to an external computing resource and intercepting an instruction directed from an application resident on the computing system to the virtual core. The intercepted instruction may be sent to the external computing resource for processing.

22 Claims, 2 Drawing Sheets

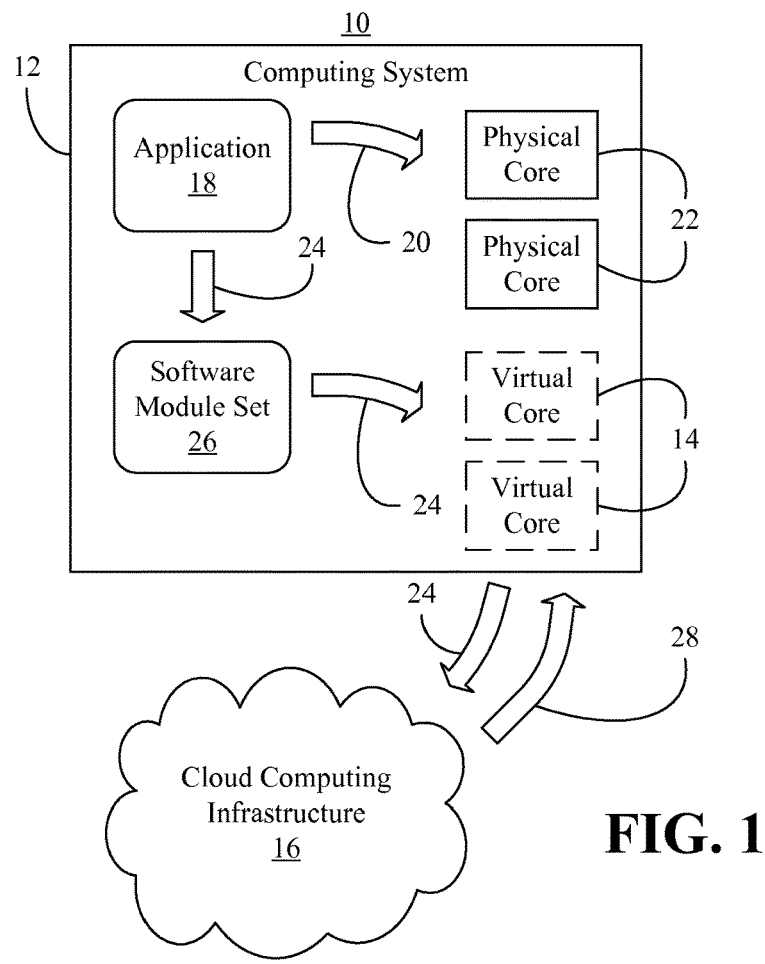
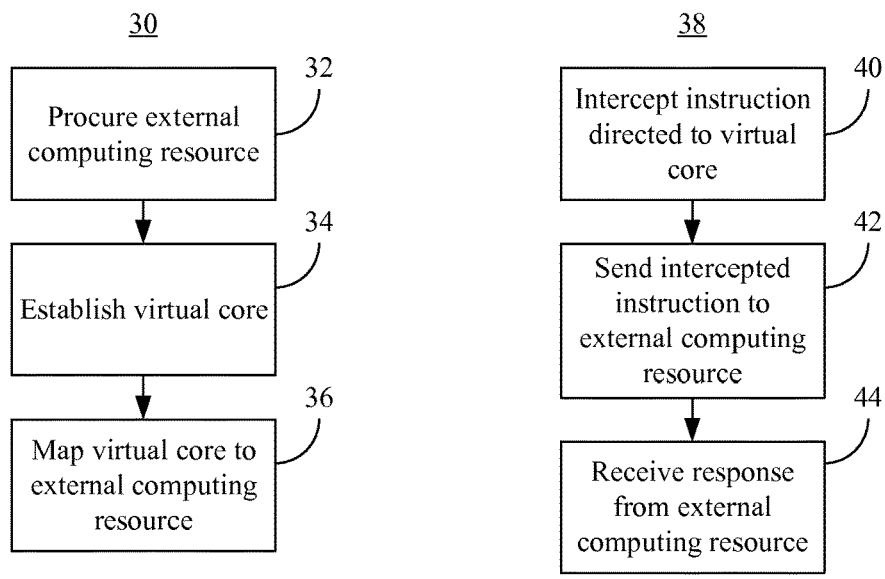
FIG. 1
FIG. 2A
FIG. 2B

VIRTUAL CORE ABSTRACTION FOR CLOUD COMPUTING

BACKGROUND

Technical Field

Embodiments generally relate to cloud computing. More particularly, embodiments relate to abstracting a computing cloud to appear as a set of virtual cores to a computing system.

Discussion

Certain software applications may occasionally require significant amounts of processing power. Conventional techniques to using cloud computing to obtain more processing power for an application may involve the purchase of virtual machines associated with a computing cloud, moving the applications from the user's computer to the virtual machines, and testing the application to ensure proper functionality. While such an approach might be suitable under certain circumstances, there still remains considerable room for improvement. For example, deploying and testing the application on the computing cloud may be time consuming and difficult.

BRIEF DESCRIPTION OF THE DRAWINGS

The various advantages of the embodiments of the present invention will become apparent to one skilled in the art by reading the following specification and appended claims, and by referencing the following drawings, in which:

FIG. 1 is a block diagram of an example of a cloud computing architecture according to an embodiment;

FIG. 2A is a flowchart of an example of a method of setting up virtual cores according to an embodiment;

FIG. 2B is a flowchart of an example of a method of executing local applications on virtual cores according to an embodiment.

DETAILED DESCRIPTION

Figure 3:
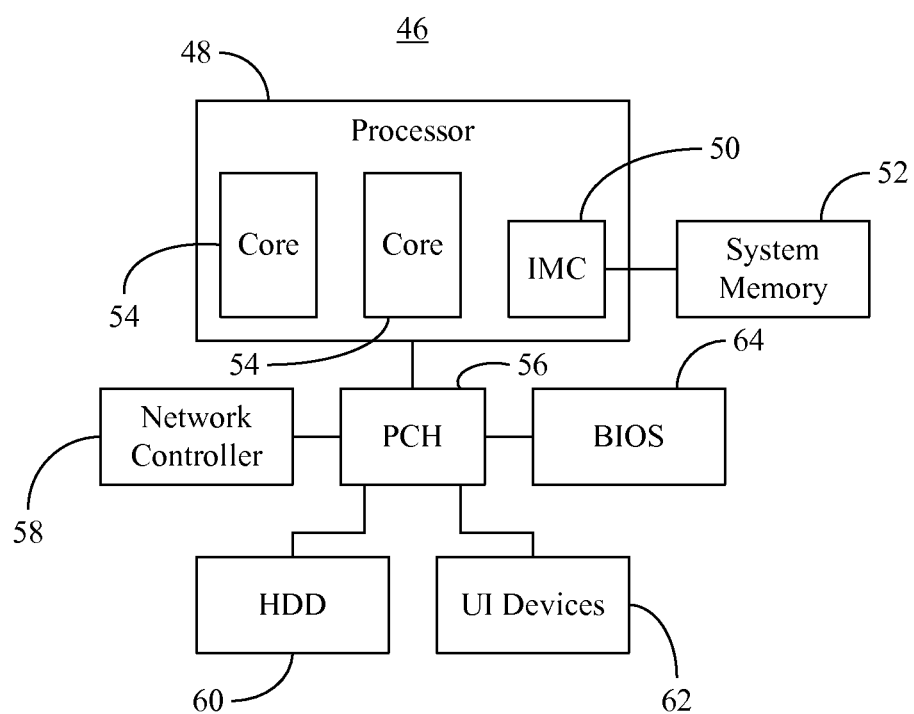
FIG. 3 is a block diagram of an example of a computing system according to an embodiment.

Embodiments may provide for a method in which a virtual core of a computing system is mapped to an external computing resource, and an instruction directed from an application resident on the computing system to the virtual core is intercepted. The method may also involve sending the intercepted instruction to the external computing resource. In one example, the external computing resource is procured from a cloud computing infrastructure.

Embodiments may also include a computer readable storage medium having logic which, if executed by a processor, causes a computer to map a virtual core of a computing system to an external computing resource, and intercept an instruction directed from an application resident on the computing system to the virtual core. The logic may also send the intercepted instruction to the external computing resource. In one example, the external computing resource is procured from a cloud computing infrastructure.

Embodiments may also include a system having a processor, a network controller, and a computer readable storage medium with logic which, if executed by the processor, cause the system to map a virtual core of the system to an external computing resource. The logic may also intercept an instruction directed from an application resident on the system to the virtual core, and send the intercepted instruction to the external computing resource via the network controller.

Turning now to FIG. 1, an architecture 10 is shown in which a computing system 12 uses a set of virtual cores 14 to obtain additional computing power from a cloud computing infrastructure 16. In the illustrated example, the virtual cores 14 are mapped to an external (e.g., remote) computing resource associated with the cloud computing infrastructure 16, wherein the external computing resource might include one or more computing system cores of a server, personal computer (PC), etc. in the cloud computing infrastructure 16. In one example, the virtual cores 14 are effectively indistinguishable from one or more physical cores 22 of the computing system 12 from the perspective of a software application 18 resident on the computing system 12.

The software application 18 may include code to handle complex calculations such as relatively large spreadsheet calculations, an operating system (OS) such as a Microsoft Windows, Linux, or Mac (Macintosh) OS, and/or other software applications in which additional computing support may be advantageous. The illustrated software application 18 issues instructions (e.g., processor cycles) 20 to the physical cores 22, as well as instructions 24 to the virtual cores 14 that are intercepted by a set of software modules 26. The intercepted instructions 24 may be sent by the software modules 26 to the external computing resource associated with the cloud computing infrastructure 16 via virtual cores 14. The external computing resource may return responses 28 to the intercepted instructions 24, wherein the responses may include computation results.

FIG. 2A shows one approach to a method 30 of setting up the virtual cores 14 (FIG. 1). The illustrated method 30, which may be repeated for a plurality of virtual cores, may be implemented in executable software as a set of logic instructions stored in a machine or computer readable storage medium of a memory such as, for example, random access memory (RAM), read only memory (ROM), programmable ROM (PROM), flash memory, etc., in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 30 may be written in any combination of one or more programming languages, including an object oriented programming language such as Java, Smalltalk, C++ or the like and conventional procedural programming languages, such as the "C" programming language or similar programming languages. On the other hand, fixed-functionality hardware or lower-level firmware instructions such as assembly language programming or machine code might be used to carry out operations shown in the method 30.

The illustrated processing block 32 provides for procuring an external computing resource from a cloud computing infrastructure. In one example, the external computing resource is procured at a boot up time associated with a computing system. Thus, block 32 might be triggered by a basic input/output system (BIOS) or other start-up routine. The procurement may involve one or more authentication and/or registration procedures with a cloud computing infrastructure, as well as the transmission of one or more requests to procure computing resources. One or more virtual cores may be established at block 34 on the computing system based on the external computing resource(s). Illustrated processing block 36 provides for mapping the virtual core(s) to the external computing resource(s). Thus, the computing cloud infrastructure 16 (FIG. 1) may be abstracted to appear to the OS and applications of a computing system as a set of virtual cores. Moreover, the cloud computing capacity may be added for use by an application resident on a computing system without moving or altering the application.

Turning now to FIG. 2B, a method 38 of executing local applications on virtual cores is shown. The method 38, which may be repeated for a plurality of instructions, may be implemented in executable software as a set of logic instructions stored in a machine or computer readable storage medium of a memory such as, for example, RAM, ROM, PROM, flash memory, etc., in fixed-functionality logic hardware using circuit technology such as, for example, ASIC, CMOS or TTL technology, or any combination thereof. Illustrated block 40 provides for intercepting an instruction directed from an application resident on a computing system to a virtual core. The intercepted instruction may be sent to the external computing resource associated with the virtual core at block 42. A response may be received from the external computing resource at block 44. In one example, the response may include a computation result.

FIG. 3 shows a computing system 46, wherein the system 46 may be part of a mobile platform such as a laptop, personal digital assistant (PDA), mobile Internet device (MID), tablet, wireless smart phone, media player, imaging device, etc., or any combination thereof. The system 46 may also be part of a fixed platform such as a PC, server, workstation, etc. The illustrated system 46 includes a host processor 48 that might include an integrated memory controller (IMC) 50 that provides access to system memory 52, which may include double data rate (DDR) synchronous dynamic random access memory (SDRAM, e.g., DDR3 SDRAM JEDEC Standard JESD79-3C, April 2008) modules. The modules of the system memory 52 may be incorporated into a single inline memory module (SIMM), dual inline memory module (DIMM), small outline DIMM (SODIMM), and so on. The processor 48 may also have one or more processor cores 54, where each core 54 may be fully functional with instruction fetch units, instruction decoders, level one (L1) cache, execution units, and so on. In one example, the internal cache(s) of the processor 48 may be implemented in static RAM (SRAM).

The illustrated processor 48 communicates with a platform controller hub (PCH) 56, also known as a Southbridge in certain systems. The PCH 56 may have internal controllers (not shown) such as USB (Universal Serial Bus, e.g., USB Specification 2.0, USB Implementers Forum), Serial ATA (SATA, e.g., SATA Rev. 3.0 Specification, May 27, 2009, SATA International Organization/SATA-IO), High Definition Audio, and other controllers. The PCH 56 may communicate with a network controller 58, which may provide off-platform communication functionality for a wide variety of purposes such as, for example, cellular telephone (e.g., W-CDMA (UMTS), CDMA2000 (IS-856/IS-2000), etc.), WiFi (e.g., IEEE 802.11, 1999 Edition, LAN/MAN Wireless LANS), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes. The illustrated PCH 56 is also coupled to one or more mass storage devices, which may include a hard disk drive (HDD) 60. Mass storage may also include ROM, optical disk, flash memory, etc. (not shown). In addition, the PCH 56 may provide support for user interface (UI) devices 62 such as a microphone, display, keypad, mouse, speakers, etc., in order to allow a user to interact with and perceive information from the system 46.

The cores 62 may execute applications 18 (FIG. 1) as well as a set of software modules 26 (FIG. 1), which might set up one or more virtual cores on the system 46 for use by the applications to obtain additional processing power from an external computing system associated with a cloud computing infrastructure. The set-up of the virtual cores might be initiated by logic/instructions that are stored on BIOS 64 (e.g., from PROM, NAND-based solid state disk (SSD), or flash memory as a patch), dynamically loaded via a tool, or already resident in the UROM (microROM, not shown) of the processor 48.

Thus, the core abstraction solutions described herein may be application agnostic and may be leveraged by both small and large applications transparently. Moreover, the solutions may be used without modification to codebases in cases where the application is able to multi-thread/multi-process instructions. For instance, a processor of a mobile platform may leverage multiple cores from the cloud computing infrastructure to perform more central processing unit (CPU) intensive operations that are otherwise difficult, impossible, or time-consuming to perform within the footprint of the platform. Similarly, a server within a datacenter might leverage cores from the cloud computing infrastructure to speed batch jobs, tape out activities, or other product development milestones.

Embodiments of the present invention are applicable for use with all types of semiconductor integrated circuit ("IC") chips. Examples of these IC chips include but are not limited to processors, controllers, chipset components, programmable logic arrays (PLA), memory chips, network chips, and the like. In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size may be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention may be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. might be used herein only to facilitate discussion, and carry no particular temporal or chronological significance unless otherwise indicated.

Those skilled in the art will appreciate from the foregoing description that the broad techniques of the embodiments of the present invention may be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:
1. A method comprising:
    mapping a virtual core of a computing system over a cloud computing infrastructure to a remote computing resource that comprises at least one physical processor, wherein the remote computing resource is external to the computing system;
    intercepting an instruction directed from a software application resident on the computing system to the virtual core; and
    sending the intercepted instruction to the at least one physical processor of the remote computing resource via a network controller, wherein remote computing capacity is added for use by the software application resident on the computing system without moving or altering the software application.

2. The method of claim 1, further including procuring the remote computing resource from a cloud computing infrastructure.

3. The method of claim 2, further including establishing the virtual core on the computing system based on the remote computing resource.

4. The method of claim 2, wherein the remote computing resource is procured at a boot time associated with the computing system.

5. The method of claim 1, further including receiving a response to the instruction from the remote computing resource.

6. The method of claim 5, wherein the response is to include a computation result.

7. The method of claim 1, further including repeating the intercepting and sending for a plurality of instructions.

8. The method of claim 1, further including repeating the mapping for a plurality of virtual cores.

9. A non-transitory computer readable storage medium comprising logic which, if executed by a processor, cause a computer to:
    map a virtual core of a computing system over a cloud computing infrastructure to a remote computing resource that comprises at least one physical processor, wherein the remote computing resource is external to the computing system;
    intercept an instruction directed from a software application resident on the computing system to the virtual core; and
    send the intercepted instruction to the at least one physical processor of the remote computing resource via a network controller, wherein remote computing capacity is to be added for use by the software application resident on the computing system without moving or altering the software application.

10. The medium of claim 9, wherein the logic, if executed, further causes a computer to procure the remote computing resource from a cloud computing infrastructure.

11. The medium of claim 10, wherein the logic, if executed, further causes a computer to establish the virtual core on the computing system based on the remote computing resource.

12. The medium of claim 10, wherein the remote computing resource is to be procured at a boot time associated with the computing system.

13. The medium of claim 9, wherein the logic, if executed, further causes a computer to receive a response to the instruction from the remote computing resource.

14. The medium of claim 13, wherein the response is to include a computation result.

15. The medium of claim 9, wherein the logic, if executed, further causes a computer to:
    intercept a plurality of instructions from at least one software application resident on the computing system; and send the plurality of instructions to the remote computing resource.

16. The medium of claim 9, wherein the logic, if executed, further causes a computer to map a plurality of virtual cores of a computing system to a corresponding plurality of remote computing resources.

17. A system comprising:
a processor;
a network controller; and
a non-transitory computer readable storage medium including logic which, if executed by the processor, cause the system to,
   map a virtual core of the system over a cloud computing infrastructure to a remote computing resource that comprises at least one physical processor, wherein the remote computing resource is external to the computing system;
   intercept an instruction directed from a software application resident on the system to the virtual core; and
   send the intercepted instruction to the at least one physical processor of the remote computing resource via the network controller, wherein remote computing capacity is to be added for use by the software application resident on the computing system without moving or altering the software application.

18. The system of claim 17, wherein the logic, if executed, further causes the system to,
establish the virtual core on the system based on the computing resource at a boot time associated with the system, and
procure the remote computing resource from a cloud computing infrastructure.

19. The system of claim 17, wherein the logic, if executed, further causes the system to receive a response to the instruction from the remote computing resource.

20. The system of claim 19, wherein the response is to include a computation result.

21. A system comprising:
a processor;
a network controller; and
a non-transitory computer readable storage medium including logic which, if executed by the processor, cause the system to,
   map a virtual core of the system over a cloud computing infrastructure to a remote computing resource that comprises at least one physical processor, wherein the remote computing resource is to be accessed over a network connection provided by the network controller;
   intercept an instruction directed from a software application on the system to the virtual core; and
   send the instruction to the at least one physical processor of the remote computing resource over the network connection provided by the network controller, wherein remote computing capacity is to be added for use by the software application on the computing system without moving or altering the software application.

22. The system of claim 21, wherein the logic, if executed, further causes the system to:
establish the virtual core on the system based on the computing resource at a boot time associated with the system, and
procure the remote computing resource from a cloud computing infrastructure via the network controller.

* * * * *